(12) United States Patent
Fjellanger et al.

(10) Patent No.: US 8,190,494 B2
(45) Date of Patent: May 29, 2012

(54) ORDER PROCESSING ANALYSIS TOOL

(75) Inventors: Carol Halsey Fjellanger, Zumbro Falls, MN (US); William J. Reilly, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1103 days.

(21) Appl. No.: 12/046,225

(22) Filed: Mar. 11, 2008

(65) Prior Publication Data

US 2009/0234749 A1 Sep. 17, 2009

(51) Int. Cl.
*G06Q 30/00* (2006.01)

(52) U.S. Cl. ........................ 705/26.8; 705/27.1

(58) Field of Classification Search .................. 705/26, 705/27
See application file for complete search history.

(56) References Cited

U.S. PATENT DOCUMENTS

| | | | | |
|---|---|---|---|---|
| 6,813,531 | B2 * | 11/2004 | Coale et al. ............ | 700/97 |
| 7,650,296 | B1 * | 1/2010 | Brunner et al. ......... | 705/26.5 |
| 2002/0120521 | A1 * | 8/2002 | Forth et al. ........... | 705/26 |

OTHER PUBLICATIONS

Chambers et al.; "Drive the revenue workflow," Imaging & Document Soulution, Feb. 1999, v8i2pg18; Proquest #52045235, 12pgs.*

Cushing; "Online catalogue enables small firms to reap SAP benefits," Computer Weekly, Aug. 5, 2003; Proquest #405840471, 3pgs.*

SAP SD (Sales and Distribution) Configuration Hints and Tips, pp. 1-2, retrieved May 7, 2008 http://www.sap-basis-abap.com/sapsd.htm.

SAP Sales and Distribution Processing Document Flow, pp. 1-2, retrieved May 7, 2008 http://www.sap-basis-abap.com/sd/sap-sd-processing-flow.htm.

Sales and Distribution (SD) advice—SAP Featured Topic, May 22, 2004, pp. 1-2 http://searchsap.techtarget.com/featuredTopic/0,290042,sid21_gci961718,00.html.

* cited by examiner

*Primary Examiner* — Robert M. Pond
(74) *Attorney, Agent, or Firm* — Yee & Associates, P.C.; John R. Pivnichny

(57) ABSTRACT

A computer implemented method and program product for order processing. In one embodiment, input is received from a user for an order. The input supplies information for configuring an order in an order processing software application, for producing a first configuration of the order. The input is analyzed to identify corrections for the first configuration to fit parameters of the order processing software application. The input is compared to a set of existing orders as part of an analysis of the input. A set of recommendations is generated concerning analysis of the input. In response to a selection by the user, the set of recommendations is executed in order to correct the first configuration of the order.

20 Claims, 6 Drawing Sheets

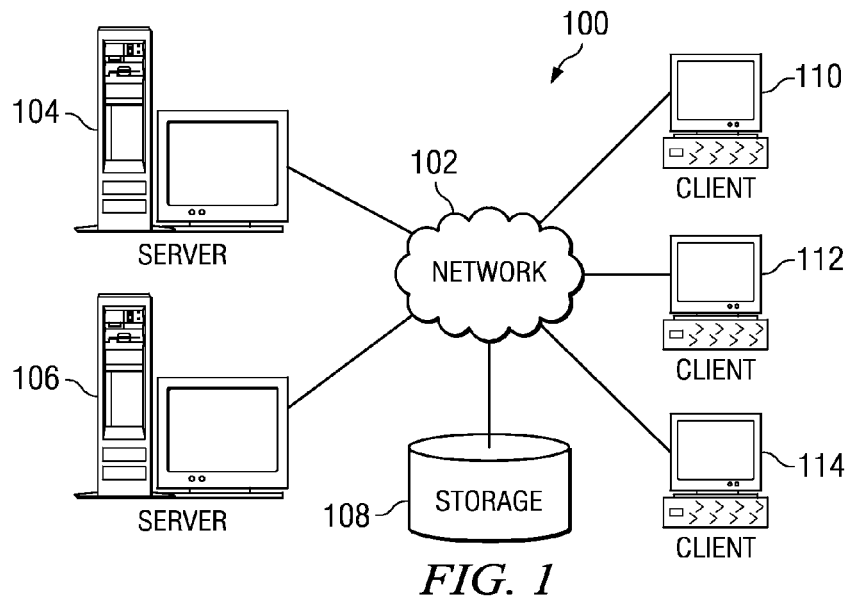
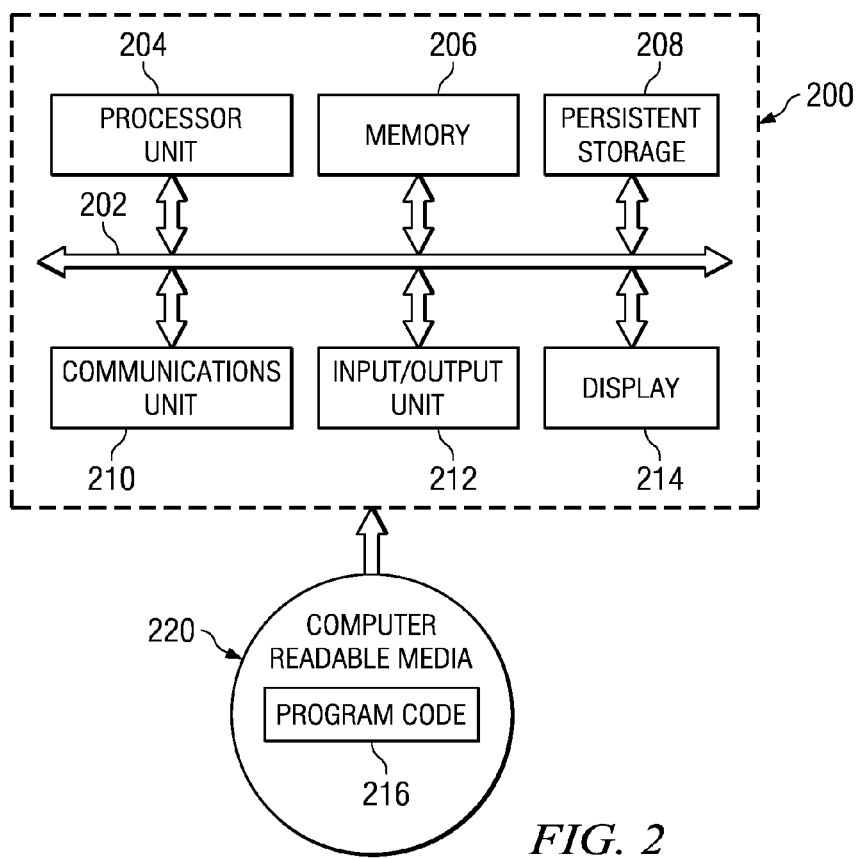
FIG. 1
FIG. 2

ORDER PROCESSING ANALYSIS TOOL

BACKGROUND OF THE INVENTION

1. Field of the Invention

The illustrative embodiments relate generally to a data processing system and in particular to a method and apparatus for order processing. Still more particularly, the illustrative embodiments are directed to a computer implemented method, and computer useable program product for order processing of products and/or services configured using an order processing software application.

2. Description of the Related Art

Various software systems and packages supporting business data management have been developed over the years. In the area of order processing, a few software applications dominate the field, including SAP™ sales and distribution (SD) software applications. SAP™ stands for Systems, Applications, and Products in Data Processing. SAP™ is a trademark of SAP™ AG, located in Waldorf, Germany. SAP™ R/3 is currently known as SAP™ ERP, which stands for Enterprise Resource Planning. SAP™ ERP (Enterprise Resource Planning) is well known in the state of the art.

SAP™ software applications are comprised of modularized, table-driven systems that perform specified functions. The functions include order processing, inventory control, financial accounting and planning, and production planning and control, to name a few features. Order processing software applications, such as SAP™ order processing software applications, are designed to interface with terminals, printers, databases, or external communications facilities.

Current order processing software applications assist with optimizing a majority of tasks and activities carried out in sales, delivery, and billing. Key elements of such order processing software applications are presales support, inquiry processing, quotation processing, sales order processing, delivery processing, billing, and sales information system.

However, these current software packages contain many complex product structures and order process scenarios. Each of these scenarios requires complicated order processing configuration setups to determine the behavior of products and/or services placed on an order as the order moves through to the end of the fulfillment process. SAP™ order processing applications, such as SAP™ sales and distribution (SD) module, usually require extensive training and certification to understand the parameters of the application. Additionally, some order processing software applications, such as SAP™ sales and distribution (SD) module, include a testing phase. In the testing phase, the entire order configuration is tested to determine whether the order configuration functions according to the original specifications by the customer as well as with the parameters of the order processing software application. If the order configuration as entered does not survive the testing phase, additional time and effort is expended in making appropriate corrections to the order configuration. Such corrections are frequently needed given the complexity of the sales orders entered into these order processing software applications.

Additionally, analysis for development or problem determination can be an enormously difficult and time consuming task. Thus, high skill levels are required to use such order processing software applications efficiently. The necessary skills to use such order processing software applications are not easily passed on to others.

BRIEF SUMMARY OF THE INVENTION

The illustrative embodiments provide a computer implemented method and program product for order processing. In one embodiment, input is received from a user for an order. The input supplies information for configuring an order in an order processing software application, for producing a first configuration of the order. The input is analyzed to identify corrections for the first configuration to fit parameters of the order processing software application. The input is compared to a set of existing orders as part of an analysis of the input. A set of recommendations is generated concerning analysis of the input. In response to a selection by the user, the set of recommendations is executed in order to correct the first configuration of the order.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation of a network of data processing systems in which illustrative embodiments may be implemented;

FIG. 2 is a block diagram of a data processing system in which illustrative embodiments may be implemented;

DETAILED DESCRIPTION OF THE INVENTION

Figure 3:
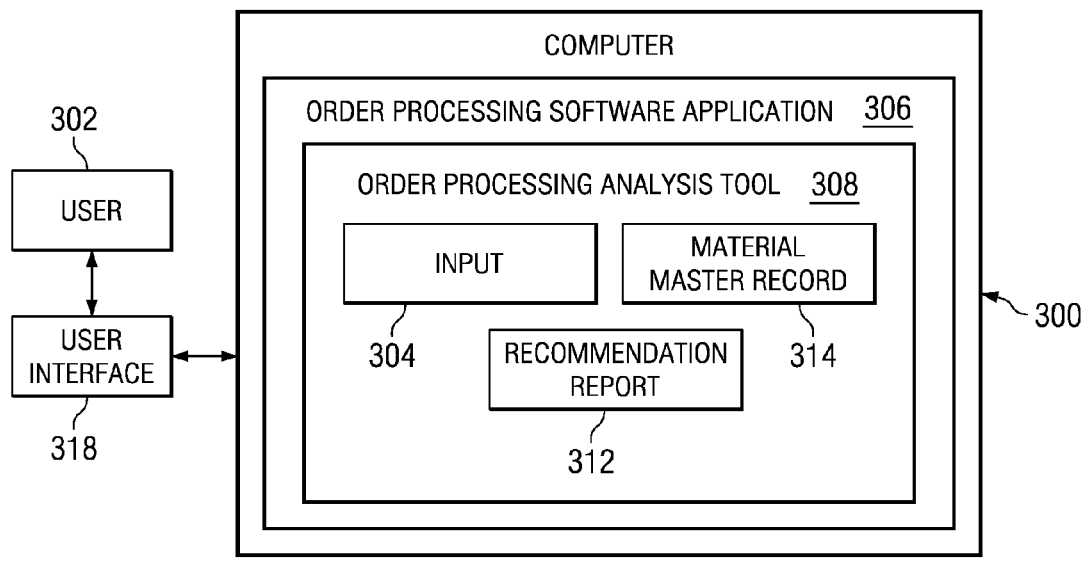
FIG. 3 is a block diagram illustrating components of the order processing analysis tool in accordance with an illustrative embodiment.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example.

In this example, clients 110, 112, and 114 include a universal reader software component. The universal reader converts a document to an image and stores the rich content of the document into rich content blocks within the document. Clients 110, 112, and 114 are used by a set of users to use a computer implemented method and program product for order processing. The term set as used herein refers to one or more. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Turning now to FIG. 2, a diagram of a data processing system is depicted in accordance with an illustrative embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links. Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208 and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Order processing software applications contain many complex product structures and order processing parameters. For a user to understand these parameters and configure an order in an order processing software application correctly requires a high level of skill and training. Even with a high level of skill and training, the order configurations are often still error prone. The process and product complexity make this a labor intensive task, and the skill necessary to accomplish this work is not easily passed on to others.

The illustrative embodiments recognize a need for an application that will assist users in order processing including configuring and testing configuration elements for selected products and services. Therefore, the illustrative embodiments provide a computer implemented method and computer program product for order processing. The computer implemented method and computer program product will also assist, validate, and perform development tasks and problem analysis for any type of order processing, including sales and distribution order processing.

In one embodiment, input is received from a user for an order process. The input supplies information for configuring order process attributes in an order processing software application to produce the initial configuration for the order process. The input is analyzed to identify the first order configuration to fit parameters of the order processing software application. The input is compared to a set of existing order attributes as part of an analysis of the input. A set of recommendations concerning analysis of the input is generated. In response to a selection by the user, the set of recommendations may be executed in order to establish the correct configuration of the order process.

FIG. 3 is a block diagram illustrating a data flow through the order processing analysis tool in accordance with an illustrative embodiment. Computer 300 may be implemented using any type of computing device, such as a personal computer, laptop, personal digital assistant, a server, or any other computing device depicted in FIGS. 1 and 2. FIG. 3 indicates the components of the order processing analysis tool 308 in accordance with one embodiment.

Order processing analysis tool 308 is used for order processing validation. Order processing includes, without limitation, assisting, validating an order process, and performing development tasks and problem analysis for users in sales and distribution order processing development. Sales and distribution refers to the selling and buying of products and/or services from a consumer. A user of an order processing software application, such as user 302, is usually providing the products and services to the consumer.

The term order, as used here, refers to a request for products or services made by another for monetary value. Another may refer, without limitation, to a client, customer, business, or organization. The item category group hierarchy is a hierarchy of data values that determine the linkage between the selected products and services and the order process.

Order processing analysis tool 308 in this embodiment is a component of order processing software application 306. However, in alternative embodiments, order processing analysis tool 308 may be separate from order processing software application 306. Order processing analysis tool 308 may be in the form of a software plug-in or an upgrade to an existing order processing software component located on a computer.

Order processing software application 306 includes, without limitation, SAP™ Enterprise Resource Planning (ERP). Order processing software application 306 also includes modules including, without limitation, modules such as the financials and controlling (FICO) module, the human resources (HR) module, the materials management (MM) module, the sales and distribution (SD) module, and the production planning (PP) modules that make up SAP™ Enterprise Resource planning applications. Order processing software application 306 includes, without limitation, all components of what was formerly known as SAP™ R/3. The SAP™ sales and distribution (SD) order processing module assists with optimizing all of the tasks and activities carried out in sales, delivery and billing. Key elements of the sales and distribution (SD) module are presales support, inquiry processing, quotation processing, sales order processing, delivery processing, billing, and sales information system. Order processing analysis tool 308 may be located on multi-platform and operating systems, including without limitation, Microsoft Windows, Unix, IBM Series I, and IBM zSeries.

Typically, order processing software applications contain menu paths for users to select the necessary parameters to enter the data related to a company's products or services. While using these order processing software applications, a user proceeds to assign necessary codes and data values to associate a configuration to a company's products and/or services.

Input 304 is a component of order processing analysis tool 308. Input 304 is received by order processing analysis tool 308 and entered by user 302. Input 304 is further described in FIG. 4 as input 404.

User interface 318 is a software tool that allows the user to enter information into computer 300. User 302 may use user interface 318 to enter input 304 and to execute the recommendation items in recommendation report 312.

Material master record 314 is an important and integral feature to any order processing software application, such as order processing software application 306. As new materials are identified, developed, or purchased, the process starts with the creation of the material master record. The material master record is a company's main source of material-specific data and is used by all components of the SAP™ sales and distribution (SD) module, which is the SAP™ order processing software application.

Every area, such as purchasing, inventory management, materials planning, and invoice verification can use the data stored in the material master record. Descriptions of the individual materials used in an enterprise are stored in material master records.

Recommendation report 312 indicates to the user any missing elements from the order process. In one embodiment, recommendation report 312 indicates to the user any sales item category group definitions needed, item category group assignments, schedule line category definitions needed, and delivery item category group definitions needed. Delivery item category group definitions needed refers to an item category group related to delivery processes. Item category assignments are recommended by the order processing analysis tool, such as order processing analysis tool 308, that may be assigned to the order type.

A schedule line category is a line item controlling the scheduling for multiple shipments of an order. For example, the schedule line category indicates that if a customer orders a quantity of ten products, the schedule line function provides the user with a means of entering the dates when the customer is scheduled to receive these products or when the products are scheduled to be shipped to the customer. In terms of levels provided within SAP™ sales and distribution (SD) current modules, the order type represents a top level or a header level. Order type indicates whether an order is new or existing. The next level consists of the item category group. The next level down consists of schedule line category.

Included within the set of recommendation items provided by recommendation report 312 are existing item category groups, existing item category group assignments, existing schedule line categories, and existing item category groups that may serve as potential matches to the product structure used by the user in the input section of order processing analysis tool 308. Thus, recommendation report 312 assists the user in developing the most suitable configuration for the order to proceed through the order processing software application 306 test system. This test system occurs after a user has provided an initial configuration for an order process.

One advantage to the recommendation report 312 is that it may be stored and retrieved by a user at a later time. The recommendation report may assist users in better understanding the parameters for configuring an order using order processing software application 424 in FIG. 4.

Order processing software application 306 executes the order process, based on how an order is configured. Users of order processing software applications, such as order processing software application 306, usually require extensive training to be able to understand and implement the parameters of these order processing software applications. The parameters are guidelines for a user that relate the ordering, billing, and shipping of an order to the order processing software application. An example of the parameters of order processing software application are the guidelines for entering correct item category groups.

In one embodiment, the user may select recommendation items from the recommendation report for execution. The user is given this option, and may in fact, after reading the recommendation report, decide against the set of recommendation items provided and decline to execute the set of recommendation items. Additionally, a user may select executing only a certain part or an individual recommendation item from the set of recommendation items provided by the recommendation report.

If the user chooses to select the recommendation items for execution, a number of options follow. The order processing analysis tool 308 can facilitate defining sales item category groups, defining item category groups, and assigning item category groups. Additionally, the order processing analysis tool can assist the user in defining and assigning schedule line categories and performing "copy control". Copy control is a process used in some SAP™ sales and distribution (SD) modules that relates all the documents together generated for a sales order as this sales order moves through the order process. Thus, when a user chooses to execute copy control, the end result is that all of the various processes related to an order are linked together so that the same data may flow from the order, to the delivery, and to the billing document within the order processing software application.

Figure 4:
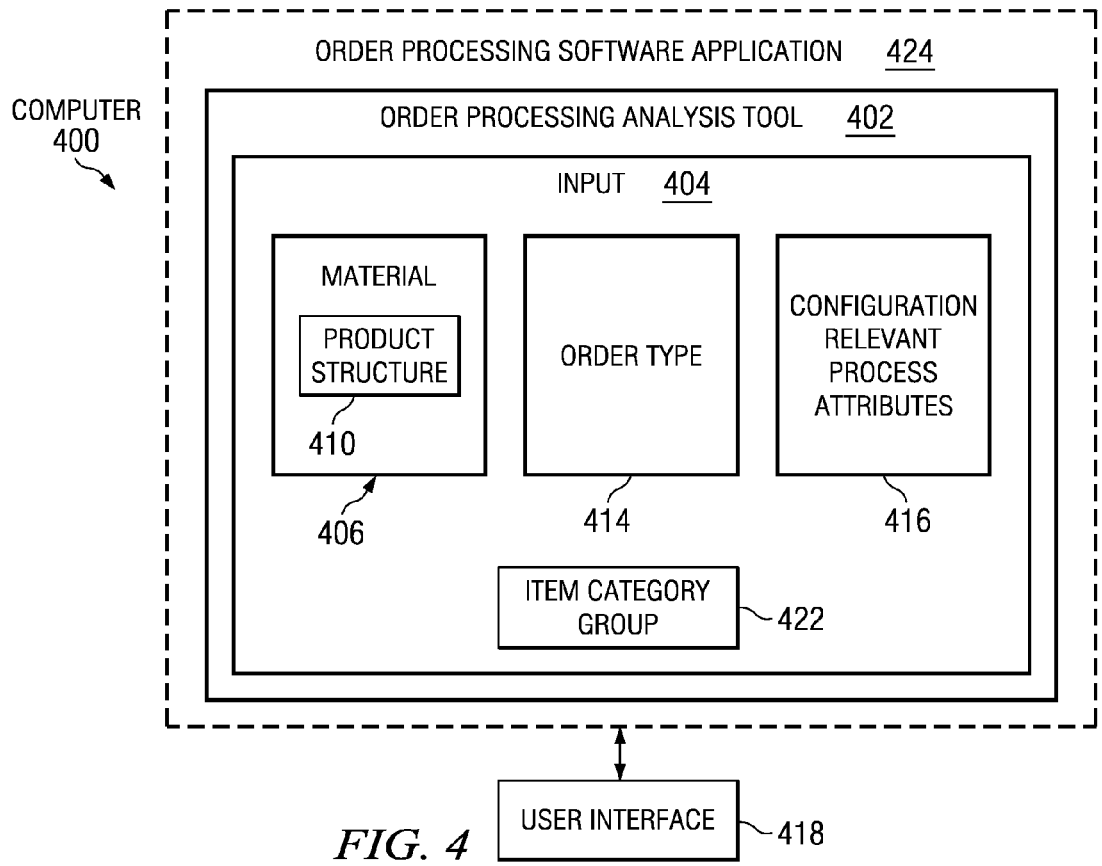
FIG. 4 is a block diagram illustrating features of the order processing analysis tool in accordance with an illustrative embodiment.

FIG. 4 is a block diagram illustrating features of the order processing analysis tool in accordance with an illustrative embodiment. FIG. 4 is a block diagram of the components of input 404. Input 404 is a component of order processing analysis tool 402, which is an example of one embodiment of input 304 in FIG. 3.

In this embodiment, input 404 is composed of material 406, order type 414, and configuration relevant process attributes 416. Additionally, input 404 is composed of item category group 422.

Material is a standard term used in order processing software applications. Material 406 refers to both products and services placed in an order. Materials must be configured in the SAP™ sales and distribution (SD) module so as to connect the materials to the needed sales and distribution processes, which include without limitation, sales, ordering, billing, and delivery processes. A material may be composed of products or services for sales and distribution.

Item category group 422 are also included in input 404. Item category group 422 is an identifier that defines the process attributes of a material on a line item in any one of a sales order document, a delivery document, or a billing document. Item category group 422 controls the type and scope of, without limitation, pricing, billing, delivery, inventory posting, and the transfer of the products and services. In one embodiment, order processing analysis tool 402 cannot analyze or compare the input without a user entering an item category group for a material.

The system in SAP™ order processing software applications uses the item category group 422 and the sales document type to determine the category of a document item. Therefore, item category group 422 is an identifier used to assist in determining the category of a document item in an order processing software application. For example, in the standard version of SAP™ order processing software applications, such as SAP™ sales and distribution (SD) modules, the item category group NORM is defined for all materials kept in stock.

Item category group 422 is defined in a material master record, such as material master record 314 in FIG. 3. Thus, item category group 422 is a component of the material master record. An item category group, such as item category group 422 is one of the most important key fields in the sales cycle within an order processing software application, such as SAP™ applications. Item category group 422 also controls the sales document and affects the schedule line category.

A relevant item category group in the sales and distribution process is the sales item category group. The sales item category group is used by the order processing software application to determine the schedule line category. The schedule line category is used to determine processes such as, without limitation, delivery and inventory management.

Item category groups can also be defined and customized in order processing software application 424, by the user. These item category groups are entered manually by the user with user interface 418.

Material 406 may be comprised of a single level or multi-level components in order processing software applications. A single level material has no sub-items. A single level material is associated with a single item category group when configured in the order processing software application, such as order processing software application 306.

However, multi-level materials have multiple components and correspond to multiple levels of item category groups. When a material has multiple components or multiple levels, the material then has multiple line items and each line item has its own item category group identifier. For example, a multi-level material may have four sub-components associated with the original material. Each sub component has its own item category group identifier that falls into a hierarchy of item category groups. This illustration is used as an example only and not intended to be a limitation on how different illustrative embodiments may be implemented.

Material 406 is composed of product structure 410. Product structure 410 is defined in terms of the item category group, such as item category group 422. Product structure 410 refers to the hierarchy of item category groups relating to both products or services.

The user may create product structure 410 by defining a set of item category groups for an order process. A user may also retrieve an existing product structure previously created and stored in order processing software application 424. By retrieving the existing product structure, the user is retrieving existing item category groups from an existing order process.

An item category group hierarchy is composed of the hierarchy of item category groups associated with a material. In the above stated example, the item category group hierarchy is composed of the item category groups associated with the four sub-components of the original material. The term may also correspond to single level material, in which case the hierarchy is limited to a single level. Item category group hierarchy is also a hierarchy of data fields that determine the linkage of the products materials and the services materials to a set of processes, wherein the set of processes relate to ordering, billing, and delivery processes.

Product structure, such as product structure 410, as used herein, is defined according to the item category group hierarchy of a material. For a single level material, only a single item category group defines the product structure in the order processing analysis tool 402. For multi-level materials, the item category group hierarchy defines the product structure. In one embodiment, a user may select performing an action for the product structure. The action that is performed by order processing analysis tool 402 which includes, without limitation, analyzing and validating existing order type configuration, comparing to other order types, and generating a recommendation to the user.

Order type 414 refers to the sales document order type. SAP™ sales and distribution (SD) modules contain many sales document types. Additionally, the user is able to create and customize any number of sales document order types as well. Common sales document order types include documents that encompass basic business process procedures related to quotations, special sales orders such as the cash sale process and the rush order process, credit and debit cycles, and the returns and free of charge subsequent deliveries process.

In one embodiment of the current invention, order type 414 refers to whether the sales document order type associated with a user's product or service is new or existing. The term "new" meaning in this context that the user has created the sales document order type and the term "existing" in this context meaning that the user has chosen to use a previously created sales document order type. The term order as used herein refers to a request for goods or services by a client from a provider of these products or services. Order may also apply to a request for a combination of goods and services. Order type 414, material 406, and configuration relevant process attributes 416 may be entered manually by a user or automatically.

Configuration relevant process attributes 416 are data elements that identify characteristics relevant to the sales and distribution of a product or service and relevant to the configuration of the product or service in an order processing software application such as order processing software application 424. Configuration relevant process attributes 416 may be divided into order process requirements, delivery process requirements, and billing process requirements. In one embodiment, configuration relevant process attributes may be selected by the user or entered automatically by order processing analysis tool 402. Some attributes that are pertinent to this process include, without limitation, whether a product or service is billable, deliverable, pricing, returns, credit check, structure scope, picking, packing, batch check, and PGI (post goods) movement.

The term "billable", as used herein, refers to billing structure and type of billing. The term "deliverable", refers to eligible for delivery via shipping. The term "pricing" refers to a process for determining price information. The order processing software application module, such as order processing software application 424, uses condition technique for pricing to determine the relevant price information for a business process from condition records. The term "returns" refers to a determination whether a product that has completed the order process is eligible for return. Credit check relates to checking the customer's credit and enables SAP™ sales and distribution (SD) module's credit management functions. The term "structure scope" indicates how a bill of material (BOM) is processed in a sales order involving this item category group. The term "picking" refers to the removal of goods from storage bins in a warehouse. The term "packing" is a procedure in which goods are packed in a particular manner that corresponds to a customer's requirements, before the delivery of these goods. The term "batch check" refers to a determination of whether the materials in the order process should come from stock managed by batches. The term "PGI (post goods issue) movement type" refers to the type of inventory consumption performed when shipment of an order is performed. This list is by no means exclusive to the attributes that may be incorporated in this or alternative embodiments of the current invention.

User interface 418 is a software tool that allows the user to enter information into computer 400.

In one embodiment, a user enters input, such as input 404, for an order to be processed in an order processing software application. The product structure for the order process is defined according to an item category group hierarchy. Order processing analysis tool 402 thereafter performs the analysis of the input to determine any missing components from the input. The analysis process allows the order processing analysis tool 402 to correct the first order configuration set up by the user to comply with the parameters of the order processing software application. The parameters of the order processing software application provide guidelines for an order to be entered and processed through the order processing software application.

As part of the analysis process, the order processing analysis tool, such as order processing analysis tool 402, compares the input to a set of existing order processes. The set of existing order processes are stored in order processing software application and have previously undergone analysis by the order processing analysis tool. The set of existing order processes are configurations of orders processes that comply with the parameters of order processing software application.

Upon performing the analysis, a recommendation report is generated by order processing analysis tool 402. A set of recommendations is included in the recommendation report. The set of recommendations includes, without limitation, sales item category group definitions needed, item category group assignments needed, schedule line category definitions needed, and delivery item category group definitions needed. Additionally, recommendation report provides information concerning existing sales, schedule line, and delivery item category group potential matches. Additionally, the set of recommendations may include configuration relevant process attributes.

Upon recommendation, a user may choose to select either all or part of the set of recommendations for execution by order processing analysis tool 402. The user may choose to execute the recommendations so as to correct the first configuration of the order, and allow the configuration to survive the testing phase of the order processing software application.

In an alternative embodiment, in response to generating the recommendation report, the user may return to the input sections of order processing analysis tool 402 in order to make changes to the input based on the recommendations. The new changes may then be re-analyzed by order processing analysis tool 402.

Figure 5:
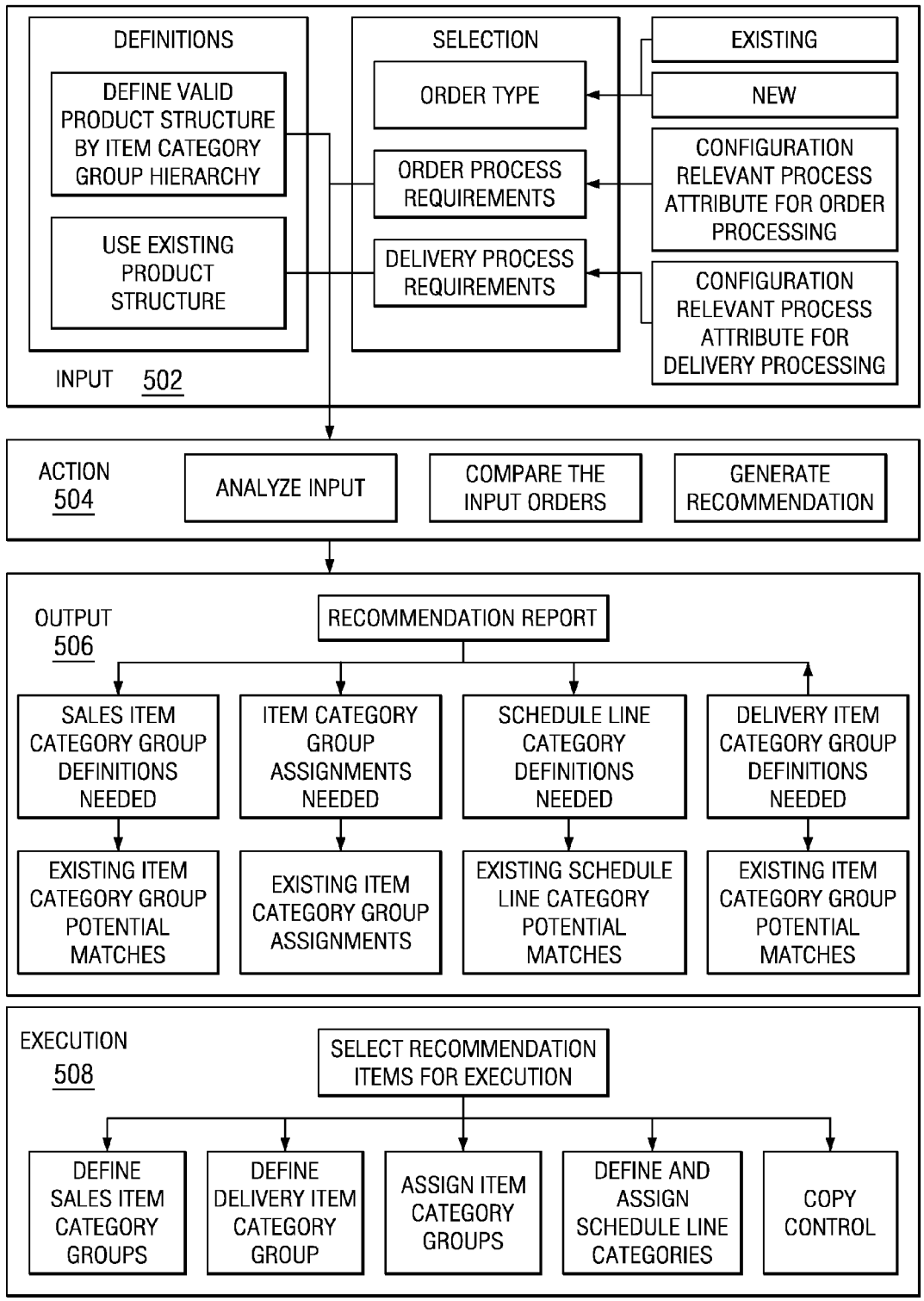
FIG. 5 is a pictorial representation illustrating a process performed by the order processing analysis tool in accordance with an illustrative embodiment.

FIG. 5 is a pictorial representation illustrating a process performed by the order processing analysis tool in accordance with an illustrative embodiment. Input 502 is composed of definitions for product structure and order type. Input 502 is also composed of order process requirements and delivery process requirements. Configuration relevant process attributes for order processing and for delivery processing fall under the category of order process requirements and delivery process requirements. An additional type of input may be configuration relevant process requirements for billing. These configuration relevant process attributes for order processing, delivery processing, and billing processing correlate to configuration relevant process attributes 416 in FIG. 4. Input 502 correlates to input 404 in FIG. 4. Input 502 is further comprised of order type, which is described as being either new or existing. Order type has been previously described in the embodiment described in FIG. 4 as order type 414.

Action 504 demonstrates one example of an action that may be performed after the product structure, order type, and configuration relevant process attributes have been selected. Order processing analysis tool 308 in FIG. 3 may analyze the input, compare the input, and generate a recommendation based on this analysis of the input and comparison to a database of existing orders. In analyzing the input, the order processing analysis tool, such as order processing analysis tool 308 in FIG. 3 and order processing analysis tool 402 in FIG. 4, compares these entries to parameters in the order processing software application that provide guideline as to how to configure an order with these entries. In comparing the input, the order processing analysis tool compares the item category groups, the order type, and the configuration relevant process attributes to a database of existing templates and existing order types. The existing templates are included within the order processing analysis tool that provide sample structures for a variety of orders.

The next step in the process provided by order processing analysis tool is output 506. Output 506 consists of the recommendation report provided by action 504. Execution 508 allows the user the option to select recommendation items for execution.

Once a configuration for an order has been through the order processing analysis tool, the configuration may be stored and re-used at a later time by a user. This feature allows a user to avoid having to re-configure an entire order process that is to be repeated using the same components as previously used in the input. Additionally, a user may retrieve a configuration that has already been through the order processing analysis tool in order to make adjustments to some, but not all, of the configuration, and allow the order processing analysis tool to analyze this new configuration.

Figure 6:
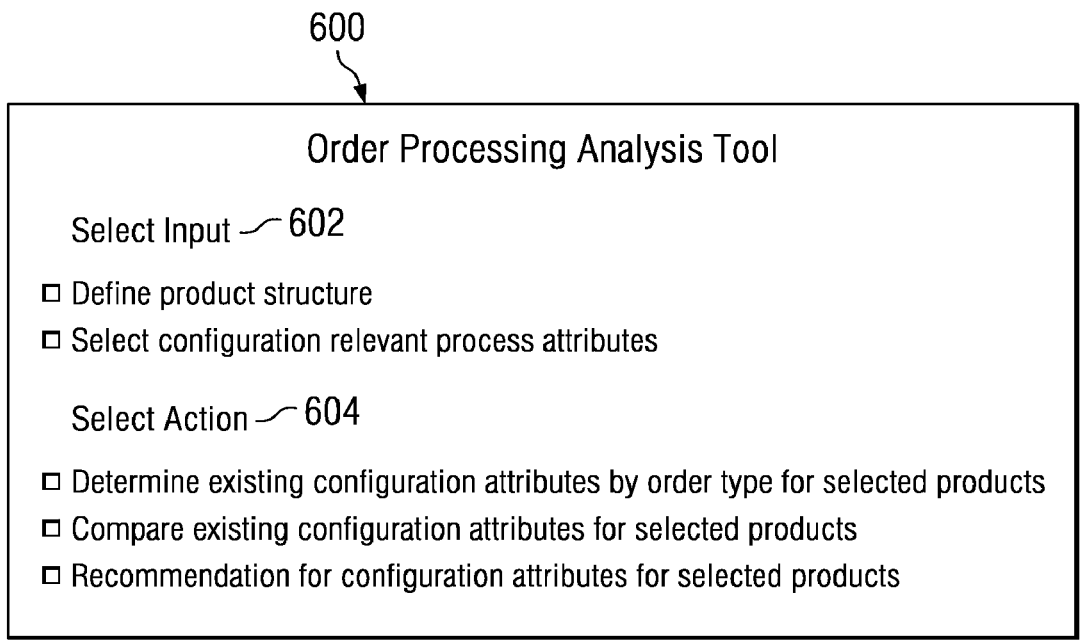
FIG. 6 is a block diagram of a screen shot of the order processing analysis tool in accordance with an illustrative embodiment.

Referring now to FIG. 6, a block diagram of a screen shot of the input and action steps of the order processing analysis tool is depicted in accordance with an illustrative embodiment. 600 is a screen shot of the input and action steps of the order processing analysis tool, such as order processing analysis tool 308 in FIG. 3 and 402 in FIG. 4. Screen shot 600 is an example of a menu path that allows the user to select the input that will be used by the order processing analysis tool to generate a recommendation report to the user, such as recommendation report 312 in FIG. 3. 602 allows a user to select input. In this example, the user can select to define product structure and/or select the configuration relevant process attributes necessary for the order. 604 allows a user to select an action. The action is associated with an item category group, such as item category group 422 in FIG. 4. In this example, the actions available to a user to select include determining existing configuration attributes by order type for selected products, comparing existing configuration attributes for selected products, and a recommendation for configuration attributes for the selected products. A recommendation for configuration attributes for the selected products provides a user with configuration attributes such as configuration relevant process attributes 416 in FIG. 4 that matches the material, order type, and product structure of the order.

Figure 7:
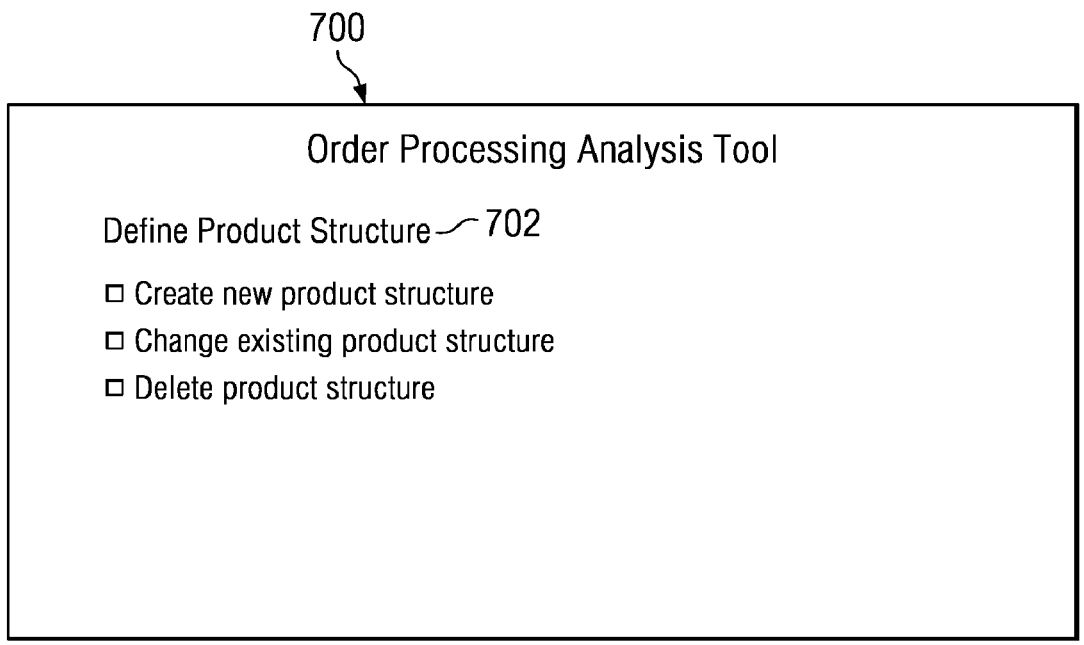
FIG. 7 is a block diagram of a screen shot of the order processing analysis tool in accordance with an illustrative embodiment.

Referring now to FIG. 7, a block diagram of a screen shot for defining product structure in the order processing analysis tool is depicted in accordance with an illustrative embodiment. 700 is a screen shot of the defining the product structure step in the order processing analysis tool, such as order processing analysis tool 308 in FIG. 3 and 402 in FIG. 4. 602 is an example of a menu path that allows the user to define the product structure, which is then used by the order processing analysis tool to generate a recommendation report to the user, such as recommendation report 312 in FIG. 3. 602 illustrates allowing a user to create a new product structure, change existing product structures, or delete product structure.

Figure 8:
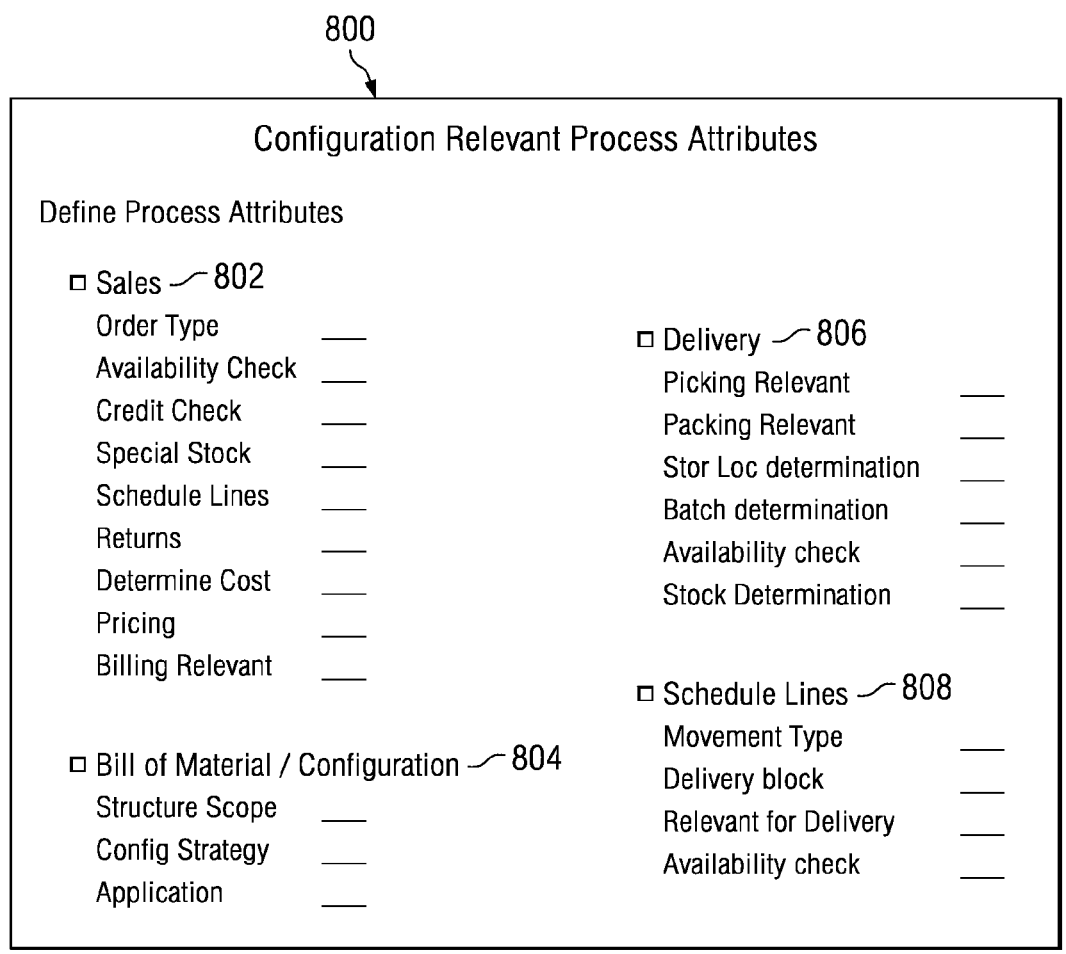
FIG. 8 is a flowchart illustrating a process for using the order processing analysis tool in accordance with an illustrative embodiment.

FIG. 8 is a block diagram of a screen shot for defining configuration relevant process attributes in accordance with an illustrative embodiment. 800 is a screen shot of a menu path that allows the user to select configuration process attributes, such as configuration relevant process attributes 416 in FIG. 4. In one embodiment, 802 correlates to sales, 804 to bill of material/configuration, 806 to delivery, and 808 to schedule lines. A user may select the configuration process attributes that the user determines are applicable to the order process.

Figure 9:
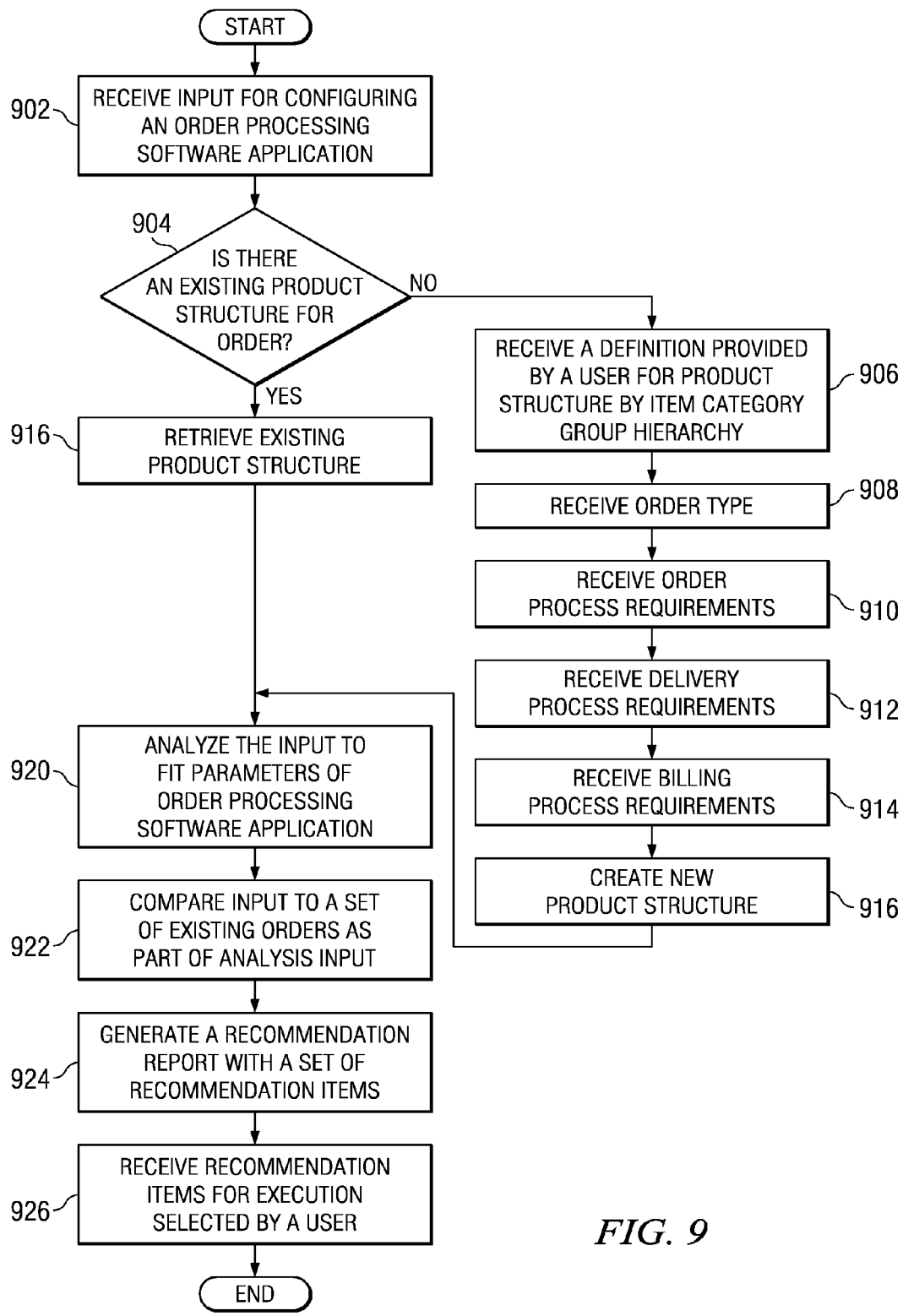
FIG. 9 is a flowchart illustrating a process for recommendation items in a recommendation report in accordance with an illustrative embodiment.

FIG. 9 is a flowchart illustrating a process for assisting, validating, determining tasks, and performing development tasks and problem analysis in complicated sales and distribution order processing in accordance with an illustrative embodiment. The process in FIG. 9 analyzes input provided for an order in a sales and distribution business modeling program. This process uses order processing analysis tool 308 and order process controller 308 from FIG. 3 to generate a recommendation report.

In the illustrative embodiment, the process begins by receiving input for configuring an order processing software application (step 902). The process then makes a determination if there is an existing product structure for the order (step 904). If the process makes a determination that there is an existing product structure for the order, then the process retrieves the existing product structure (step 916). If there is not an existing product structure for the order, the process receives a definition provided by a user for product structure by item category group hierarchy (step 906). The process then receives order type (step 908). The process receives order process requirements (step 910). The process then receives delivery process requirements (step 912). The process then receives billing process requirements (step 914). The process then creates a new product structure (step 918). The process then proceeds to analyze the input to fit parameters of order processing software application (step 920).

The process then compares the input to a set of existing orders as part of the analysis of the input (step 922). A recommendation report is generated with a set of recommendation items (step 924). The recommendation items selected by a user are received for execution and the process terminates thereafter (step 926).

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The different illustrative embodiments provide multiple advantages. The order processing analysis tool allows for fewer user errors since the configuration analysis tool assists users in structuring the configurations. New users should also find the invention helpful since the invention offers a process oriented view of configuration, which enables a logical approach for educating new users.

The order processing analysis tool additionally allows for less redundant configuration and allows for validation of configuration before the configuration is transported to the test system. This feature helps provide fewer test problems and will enhance overall productivity for the client. Other advantages, objects, and features of the invention will be readily apparent to those skilled in the art from the previously included detailed description of preferred embodiments in conjunction with the accompanying drawings and claims.

The invention can take the form of an entirely hardware embodiment, an entirely software embodiment or an embodiment containing both hardware and software elements. In a preferred embodiment, the invention is implemented in software, which includes but is not limited to firmware, resident software, or microcode.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but no limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for order processing, the computer implemented method comprising:
   responsive to receiving input for configuring an order processing software application, determining whether an existing product structure exists for the application, wherein the input supplies information for configuring an order in an order processing software application, for producing a first configuration of the order;
   responsive to determining that the existing product structure does not exist for the application, receiving a definition provided by a user for the product structure by item category group hierarchy, receiving an order type for the product structure, receiving order process requirements for the product structure, receiving delivery process requirements for the product structure, and receiving billing process requirements for the product structure;
   responsive to receiving the definition for the product structure, the order type for the product structure, the order process requirements for the product structure, the delivery process requirements for the product structure, and the billing process requirements for the product structure, creating a new product structure;
   analyzing the input to identify corrections for the first configuration to fit parameters of the order processing software application;
   comparing the input to a set of existing orders as part of an analysis of the input;
   generating a set of recommendations concerning analysis of the input; and
   responsive to a selection by the user, executing the set of recommendations in order to correct the first configuration of the order.

2. The computer implemented method of claim 1, further comprising:
   defining a product structure as part of receiving the input, wherein the product structure is defined according to an item category group hierarchy, wherein the item category group hierarchy is a hierarchy of data fields that determine the linkage of a material to a set of processes.

3. The computer implemented method of claim 1, wherein the set of recommendations is contained in a recommendation report, and wherein the set of recommendations further comprises providing needed sales item category group definitions, needed item category group assignments, needed schedule line category definitions, and delivery item category group definitions.

4. The computer implemented method of claim 1, wherein the input includes the material, wherein the material further comprises products and services related to the order.

5. The computer implemented method of claim 4, wherein the material may be composed of a single level item category group or a multi-level item category group hierarchy depending on whether the material has subcomponents according to the parameters of the order processing software application.

6. The computer implemented method of claim 1, wherein configuration relevant process attributes include order process requirements, billing process requirements, and delivery process requirements.

7. The computer implemented method of claim 1, wherein the user may decline to execute the set of recommendations generated in the recommendation report.

8. The computer implemented method of claim 1, further comprising:
responsive to generating the recommendation report, receiving changes made by the user to the input to create a second configuration of the order; and
analyzing the input from the second order configuration.

9. The computer implemented method of claim 1, wherein defining the product structure further comprises:
retrieving an existing product structure for either a same order previously configured or for another order.

10. The computer implemented method of claim 1, wherein the item category group is defined in a material master record in the order processing software application.

11. A computer program product comprising:
a computer usable medium including computer usable program code encoded thereon and executable by a processor for order processing, the computer usable code comprising:
computer usable program code for responsive to receiving input for configuring an order processing software application, determining whether an existing product structure exists for the application, wherein the input supplies information for configuring an order in an order processing software application, for producing a first configuration of the order;
computer usable program code, responsive to determining that the existing product structure does not exist for the application, for receiving a definition provided by a user for the product structure by item category group hierarchy, for receiving an order type for the product structure, for receiving order process requirements for the product structure, for receiving delivery process requirements for the product structure, and for receiving billing process requirements for the product structure;
computer usable program code, responsive to receiving the definition for the product structure, the order type for the product structure, the order process requirements for the product structure, the delivery process requirements for the product structure, and the billing process requirements for the product structure, for creating a new product structure;
computer usable program code for analyzing the input to identify corrections for the first configuration to fit parameters of the order processing software application;
computer usable program code for comparing the input to a set of existing orders as part of an analysis of the input;
computer usable program code for generating a set of recommendations concerning analysis of the input; and
computer usable program code for, responsive to a selection by the user, executing the set of recommendations in order to correct the first configuration of the order.

12. The computer program product of claim 11, wherein the product structure is defined according to an item category group hierarchy, wherein the item category group hierarchy is a hierarchy of data fields that determine the linkage of a material to a set of processes.

13. The computer program product of claim 11, wherein the set of recommendations further comprises providing needed sales item category group definitions, needed item category group assignments, needed schedule line category definitions, and delivery item category group definitions.

14. The computer program product of claim 11, wherein the input includes the material, wherein the material further comprises products and services related to the order.

15. The computer program product of claim 14, wherein the material may be composed of a single level item category group or a multi-level item category group hierarchy depending on whether the material has subcomponents according to the parameters of the order processing software application.

16. The computer program product of claim 11, wherein configuration relevant process attributes include order process requirements, billing process requirements, and delivery process requirements.

17. The computer program product of claim 11, wherein the user may decline to execute the set of recommendations generated in the recommendation report.

18. The computer program product of claim 11, further comprising:
responsive to generating the recommendation report, receiving changes made by the user to the input to create a second configuration of the order;
analyzing the input from the second configuration.

19. The computer program product of claim 11, wherein defining the product structure further comprises:
retrieving an existing product structure for either a same order previously configured or for another order.

20. A computer implemented method for order processing, the computer implemented method comprising:
responsive to receiving input for configuring an order processing software application, determining whether an existing product structure exists for the application, wherein the input comprises input for an order composed of an order type, configuration relevant process attributes, and a material, wherein the material may be composed of a single level item category group or a multi-level item category group hierarchy;
responsive to determining that the existing product structure does not exist for the application, defining a product structure as part of an input process, receiving an order type for the product structure, receiving order process requirements for the product structure, receiving delivery process requirements for the product structure, and receiving billing process requirements for the product structure, wherein the item category group hierarchy is a hierarchy of data fields that determine the linkage of the material to a set of processes, wherein the set of processes relate to ordering, billing, and delivery processes;
creating a first configuration of the order with the input provided;
analyzing the first configuration and the product structure to identify corrections for the first configuration to fit parameters of an order processing software application;
comparing the input to a set of existing orders as part of an analysis of the input;
generating a recommendation report, wherein the recommendation report comprises a set of recommendations concerning analysis of the input; and
responsive to a selection by the user, executing the set of recommendations in order to correct the first configuration of the order.

* * * * *